Nov. 8, 1966     T. F. TREFNY     3,283,538
SHOCK ABSORBING COUPLING
Filed Jan. 25, 1965     2 Sheets-Sheet 1
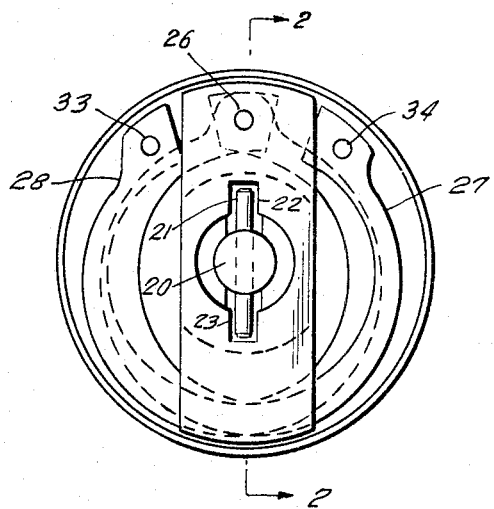
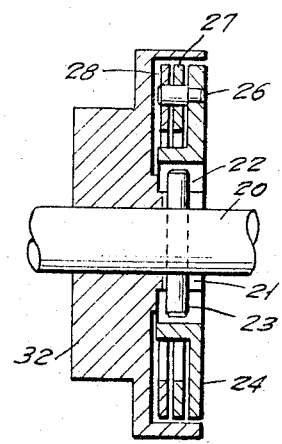
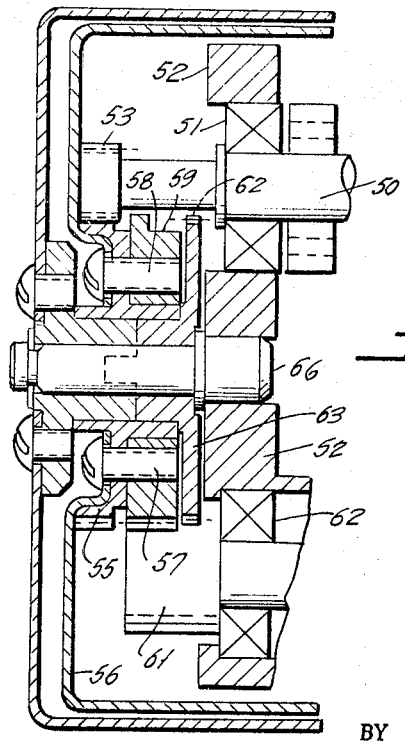
INVENTOR.
THOMAS F. TREFNY
BY
OSTROLENK, FABER, GERB & SOFFEN
ATTORNEYS Nov. 8, 1966     T. F. TREFNY     3,283,538
SHOCK ABSORBING COUPLING
Filed Jan. 25, 1965     2 Sheets-Sheet 2
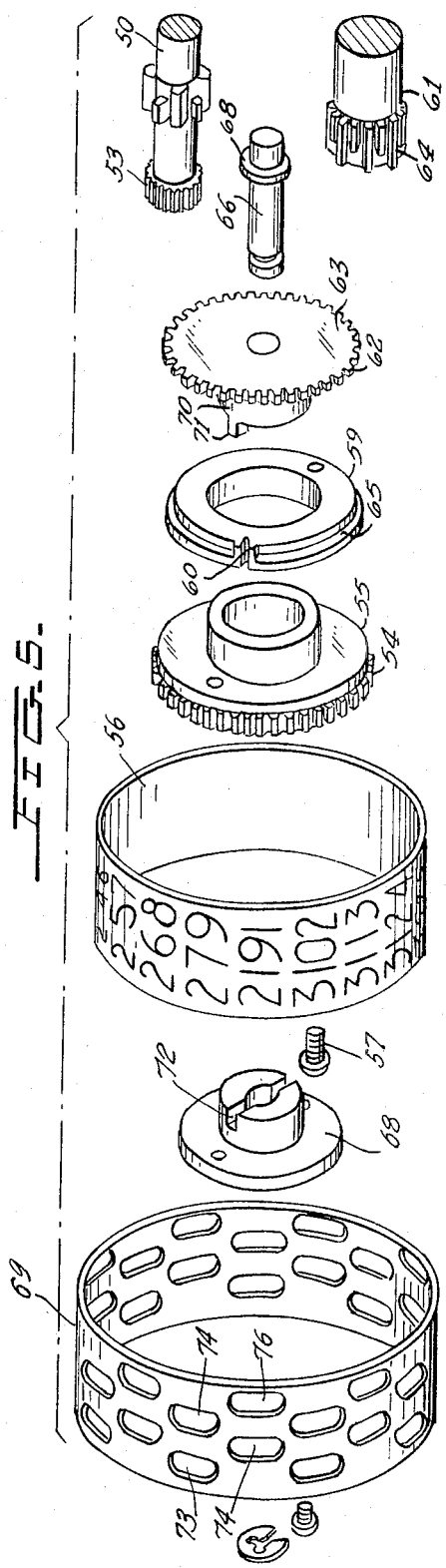
INVENTOR.
THOMAS F. TREFNY
BY
OSTROLENK, FABER, GERB & SOFFEN
ATTORNEYS

3,283,538
SHOCK ABSORBING COUPLING
Thomas F. Trefny, Hicksville, N.Y., assignor to Kollsman Instrument Corporation, Elmhurst, Queens, N.Y., a corporation of New York
Filed Jan. 25, 1965, Ser. No. 427,827
4 Claims. (Cl. 64—27)

This invention relates to angle counters, and more specifically relates to a novel shock coupling input assembly and rotatable drum window assembly for improving the operation of high speed angle counters.

It is a primary object of this invention to provide a novel spring-type coupling for connecting the input rotating shaft of a high speed angle counter to a Geneva drive mechanism through a novel spring coupling structure.

Another object of this invention is to substantially reduce the shock imparted to the mechanism of an angle counter due to angular acceleration of the input shaft.

Yet another object of this invention is to provide a novel masking drum arrangement for selectively masking the multiple rows of characters on the numeral drum of a high speed angle counter.

Another object of this invention is to provide a novel masking drum for high speed angle counters which is dynamically balanced, positively positioned, and does not require additional input power to operate.

These and other objects of this invention will become apparent from the following description when taken in connection with the drawings, in which:

FIGURE 1 is an end plan view of the novel coupling adapter of the invention.

FIGURE 2 is a cross-sectional view of FIGURE 1 taken across the lines 2—2 in FIGURE 1.

FIGURE 3 is an exploded perspective drawing of the novel shock coupling assembly of FIGURES 1 and 2.

FIGURE 4 is a cross-sectional view of the large numeral and windowed drum which could be driven through a linkage beginning with the coupling mechanism of FIGURES 1, 2 and 3.

FIGURE 5 is an exploded perspective view of FIGURE 4.

Referring first to FIGURES 1, 2 and 3, I have illustrated therein a novel shock coupling for coupling a rotatable member to an output member through a novel shock-absorbing spring structure. This type of arrangement has particular application to a high speed angle counters in which the rotating shaft drives a Geneva mechanism at high speed, and thus is susceptible to relatively large shock loads which decrease the life of the mechanism.

The present invention provides means for absorbing such shock loading, thus substantially increasing the life of the counter and permitting extremely high speed operation of the counter.

More particularly, FIGURES 1, 2 and 3 illustrate an input shaft 20 which has a coupling pin 21 rigidly secured thereto. The pin 21 is nested in slots 22 and 23 in a coupling adapter 24 which has an opening 25 therein for passing the shaft 20. That is to say, the left-hand end of shaft 20 may be pivotally mounted in a suitable bearing structure which is to the left of the coupling assemblage so that the shaft passes completely through the assemblage. Clearly, however, the shaft 20 could terminate at pin 21, if desired.

The coupling adapter 24 then has a pin 26 extending therefrom and secured thereto. First and second coupling springs 27 and 28, which may be of any desired hardened spring material, are each provided with two openings 29–30 and 31–32a adjacent their respective split ends. The pin 26 then passes through aligned openings 29 and 32a, as illustrated.

A drum assembly 32 is then provided which could, for example, have angular characters thereon which has two internal pins 33 and 34. Pin 33 passes through opening 31 in spring 28, while pin 34 passes through opening 30 in spring 27, as illustrated particularly in FIGURES 1 and 3.

A central projecting section 35 of drum assembly 32 then passes into the interior of opening 25 of the coupling adapter 24 with the coupling adapter 24 and springs 27 and 28 nesting within the rim 36 of drum assembly 32. The complete assembly is then held together in any desired manner as by a covering lid (not shown) which seats atop rim 36 to prevent removal of coupling adapted 24 and pin 21 of shaft 20.

The drum assembly 32 is then provided with a standard type Geneva drive mechanism including the arcuate cut 37 and pin 38 which will drive a suitable Geneva gear mechanism leading to the next counter stage, whereupon a 360° rotation of drum 32 will advance the next stage by one gear step.

As pointed out above, where extremely high angular accelerations of shaft 20 are involved, the transmission of force from the Geneva drive mechanism has been concomitant with the great shock forces. With the present invention, however, shock forces will be absorbed in the flexing of springs 27 and 28, thereby to substantially increase the life of the drive mechanism. That is to say, and assuming that the shaft in FIGURES 1 and 3 is rotating clockwise, once the drive member 38 begins to drive its respective Geneva gear, the Geneva gear and its associated mechanism will resist this drive with some certain torque.

This torque will now operate to cause spring 27 to contract and spring 28 to expand. This spring action will, therefore, absorb a substantial amount of the shock force, thus permitting a relatively smooth transmission of power from the drive member 28 to its respective Geneva gear. Where the rotation of shaft 20 is counterclockwise, the springs 27 and 28 will operate in an opposite manner, whereupon springs 28 will contract, while spring 27 will expand, thereby again substantially absorbing large amounts of the shock force that would normally be transmitted to the drive mechanism.

As a further feature of the invention, there is provided a novel rotating mask for the large numeral drum which terminates the number drum train. That is to say, the Geneva drive mechanism of drum assembly 32 will operate a large number of drums, depending upon the number of columns there are to be read in the angle counter.

The last stage of this mechanism is illustrated in FIGURES 4 and 5 where a shaft 50 is intermittently driven, depending upon the rotation of the immediately last numeral drum. The shaft 50 of FIGURES 4 and 5 is pivotally mounted by a suitable bearing 51 carried in the mounting frame, schematically illustrated as mounting frame 52. The end of intermittent drive shaft 50 is provided with a gear 53 which meshes with the outer gear surface 54 of the drum gear 55. The drum gear 55 is secured to the large numeral drum 56 as by screws such as screws 57 and 58 of FIGURE 4. The drum gear 55 is further connected to a transfer disk 59 as by the same screws 57 and 58 where the transfer disk 59 is provided with an involute tooth form 60.

An intermittent idler pinion 61 which is mounted in bearings 62 secured to the frame 52 then connects the outer gear surface 62 of the windowed drum coupling gear 63 to the transfer disk 59 with the gear 64 of idler pinion 61 riding in the annular notch 65 of transfer disk 59 leading to tooth form 60. The coupling gear 63 is then pivotally mounted on pivot post 66 which also pivotally mounts a keyed hub 68. The keyed hub 68 is then directly secured to the windowed drum 69, whereupon rotation of keyed hub 68 will rotate drum 69.

The coupling gear 63 is further connected to an extended key section 70 having an extending key 71 which fits into the slot 72 of keyed hub 68. Thus, rotation of coupling gear 63 will rotate drum 69.

The drum 69 is then telescoped over the large numeral drum 56. Drum 69 then has staggered rows of openings such as openings 73–74, 75–76 and so on, which expose alternate rows of numerals on the numeral drum 56.

In operation, the windowed drum 69 will be intermittently moved by the transfer disk attached to the large numeral drum assembly. Thus, during normal operation, and with the windowed drum 69 in a predetermined position, the large locking diameter of the transfer disk 59 will contact the flanks of gear 64, thus preventing rotation of the intermittent idler pinion 61. However, after one complete revolution of the large numeral drum 56, the involute tooth form 60 of the transfer disk 59 meshes with the full tooth form of the intermittent idler pinion 64. Rotation is then transmitted to the windowed drum 69 by the meshing of the windowed drum coupling gear 63 through the keyed hub 68 of the drum assembly. This rotation will then expose a new row of numerals for the next rotation of the drum assembly, whereupon the next line of figures are exposed for observation, thereby eliminating the need for a second drum stage.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A shock absorbing coupling comprising a first rotatable member, a second rotatable member, a first circular spring having first and second opposing ends, a second circular spring having first and second opposing ends; said first and second ends of said first and second springs having respective connection means; said first and second members having opposing surface portions extending therefrom; said first and second members being coaxial; said first and second circular springs being coaxial with one another and with said first and second members; said portion of said first member surface having first and second connection means connected to said connection means of each of said first ends of said first and second springs respectively; said surface portion of said second member having single connection means connected to each of said connection means of said second ends of said first and second circular springs.

2. The device substantially as set forth in claim 1 wherein said connection means of said first and second ends of said first and second circular springs comprise openings through said first and second ends; said first and second connection means of said first member surface portion and said single connection means of said second member surface portion comprising extending pins.

3. The device substantially as set forth in claim 1 wherein said second member surface portion has an axially extending peripheral rim; said first and second circular springs being nested within said rim.

4. The device substantially as set forth in claim 1 which further includes a Geneva drive means connected to said first member.

References Cited by the Examiner
UNITED STATES PATENTS

| | | | |
|---|---|---|---|
| 2,263,113 | 11/1941 | Wichorek et al. | 64—27 |
| 2,336,307 | 12/1943 | Slye | 64—27 |
| 2,420,808 | 5/1947 | Bliss | 235—1 |
| 2,661,903 | 12/1953 | Goldbach | 235—117 |
| 2,719,004 | 9/1955 | Bliss | 235—1 |
| 2,729,078 | 1/1956 | Schmidt | 64—27 X |
| 2,783,627 | 3/1957 | Rossmann | 64—27 |
| 2,841,000 | 7/1958 | Parks et al. | 64—27 |
| 2,929,554 | 3/1960 | Williams | 235—117 |
| 3,002,594 | 10/1961 | Haseler et al. | 64—27 X |
| 3,010,652 | 11/1961 | Heuver et al. | 235—117 |
| 3,013,413 | 12/1961 | Luning | 64—27 |
| 3,065,909 | 11/1962 | Herr | 235—139 |

FRED C. MATTERN, Jr., *Primary Examiner.*

LOUIS J. CAPOSI, HALL C. COE, *Examiners.*